United States Patent [19]

Harms et al.

[11] Patent Number: 4,773,914
[45] Date of Patent: Sep. 27, 1988

[54] PROCESS FOR TRICHROMATIC DYEING POLYAMIDE FIBRES

[75] Inventors: Wolfgang Harms; Hans-Günter Otten, both of Leverkusen, Fed. Rep. of Germany

[73] Assignee: Bayer Aktiengesellschaft, Leverkusen, Fed. Rep. of Germany

[21] Appl. No.: 947,668

[22] Filed: Dec. 30, 1986

[30] Foreign Application Priority Data

Jan. 15, 1986 [DE] Fed. Rep. of Germany ....... 3600889

[51] Int. Cl.$^4$ .................. C09B 1/34; C09B 67/22; D06P 1/39; D06P 3/04
[52] U.S. Cl. ................................ 8/641; 8/676; 8/679; 8/924; 8/929; 260/372; 260/374
[58] Field of Search .................. 8/641, 676, 679; 260/374, 372

[56] References Cited

U.S. PATENT DOCUMENTS

| | | | |
|---|---|---|---|
| 4,146,363 | 3/1979 | Harms et al. | 8/643 |
| 4,402,704 | 9/1983 | Raisin et al. | 8/641 |
| 4,445,905 | 5/1984 | Schaetzer et al. | 8/641 |
| 4,537,598 | 8/1985 | Schaetzer et al. | 8/641 |
| 4,579,561 | 4/1986 | Rowe et al. | 8/641 |

OTHER PUBLICATIONS

Colour Index (Third Edition), (Soc. Dyers and Colourists), 1971, vol. 4, p. 4549.

*Primary Examiner*—A. Lionel Clingman
*Attorney, Agent, or Firm*—Sprung Horn Kramer & Woods

[57] ABSTRACT

Dyestuffs which are highly suitable for use as the blue component in the trichromatic dyeing of polyamide fibre materials have the formula

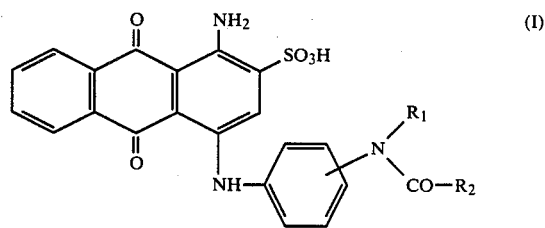

in which
$R_1$ and $R_2$ denote alkyl, the total number of the C atoms in the radicals $R_1$ and $R_2$ being at least three.

The dyeings obtained are distinguished, inter alia, by good ozone fastness and the absence of the catalytic fading effect.

7 Claims, No Drawings

PROCESS FOR TRICHROMATIC DYEING POLYAMIDE FIBRES

The present invention relates to a process for dyeing or printing polyamide fibre materials by the trichromatic principle, which is understood as meaning the use of such dyestuffs in the three principal colours which can be combined in any desired mixing ratio to produce any desired shade with a consistent colour build-up.

In commercially available trichromatic systems the blue component comprises almost exclusively dyestuffs of the type of the 1-amino-4-(alkanoylaminophenyl)-aminoanthraquinone-2-sulphonic acids (cf. for example EP-A-83,299, -92,512, -127,579 and -153,052) or of the 1-amino-4-(p-acetylmethylaminophenyl)-aminoanthraquinone-2-sulphonic acid (=C.I. Acid Blue 41).

These dyestuffs are well proven, yet have the disadvantage of not completely satisfactory compatibiity. In addition, some types are deficient in ozone fastness and in the stability to water of higher degrees of hardness.

It has now been found, surprisingly, that these disadvantages can be overcome completely or at least partially by using as the blue component in trichromatic dyeing dyestuffs which, in the form of the free acid, conform to the formula

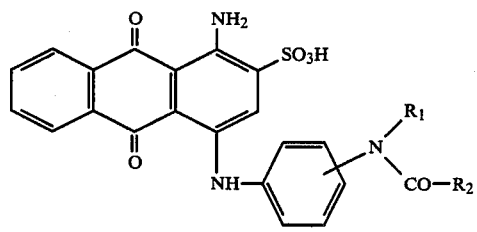

(I)

in which $R_1$ and $R_2$ independently of each other denote $C_1$–$C_4$-alkyl, with the proviso that the total number of C atoms in the radicals $R_1$ and $R_2$ is at least three and the —$NR_1COR_2$ grouping is situated in the m- or p-position.

Preferred blue dyestuffs to be used according to the invention are those of the formula I in which $R_1$ denotes methyl or ethyl and $R_2$ denotes methyl, ethyl or n-propyl, again subject to the abovementioned proviso.

Particular preference is given to dyestuffs of the formula I with the $NR_1COR_2$ group in the p-position.

If desired, these dyestuffs can also be used mixed with blue dyestuffs of the formula

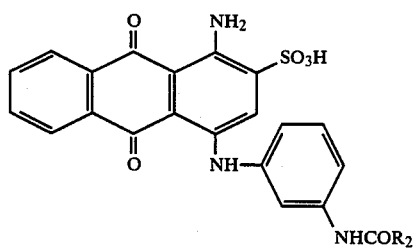

(II)

in a weight ratio of 90:10 to 10:90.

Suitable yellow/orange and red dyestuffs are in principle any commercially available acid dyestuffs of this shade.

Preferred yellow-orange components are dyestuffs which, in the form of the free acid, conform to the formula

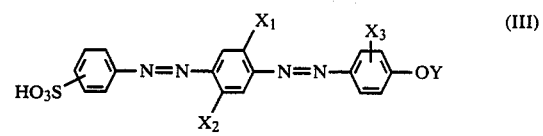

(III)

in which $X_1$, $X_2$ and $X_3$ independently of one another denote hydrogen, $C_1$–$C_4$-alkyl or $C_1$–$C_4$-alkoxy and Y denotes $C_1$–$C_4$-alkyl or $C_2$–$C_4$-hydroxyalkyl.

Suitable yellow components are furthermore indoleazo dyestuffs as described in DE-A-2,159,602 (corresponding to U.S. Pat. No. 3,891,619) and nitrodiphenylamine-azo dyestuffs as described in U.S. Pat. Nos. 4,060,383 and 3,994,873.

Preferred red components are dyestuffs which, in the form of the free acid, conform to the formula

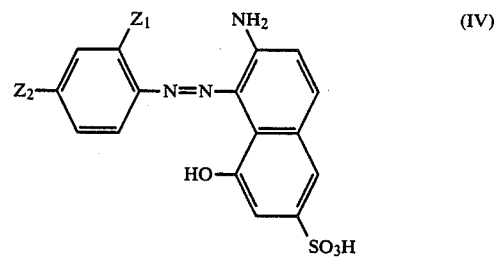

(IV)

in which $Z_1$ denotes $CF_3$, $SO_2W_1$, $SO_3W_2$ or $SO_2NV_1V_2$ and $Z_2$ denotes hydrogen, $C_2$–$C_4$-alkanoylamino, $C_1$–$C_4$-alkoxy-$C_2$–$C_4$-alkanoylamino or $C_1$–$C_5$-alkoxy, with the proviso that $Z_2$ is hydrogen when $Z_1$ stands for $SO_2W_1$, $SO_3W_2$ or $SO_2NV_1V_2$, where $V_1$ denotes $C_1$–$C_4$-alkyl, $V_2$ denotes cyclohexyl, $W_2$ or $C_1$–$C_4$-alkyl, $W_1$ denotes $C_1$–$C_4$-alkyl or $W_2$ and $W_2$ denotes optionally $CH_3$— or Cl-substituted phenyl.

Preference is given to dyestuffs of the formula IV in which $Z_1$ denotes $CF_3$ and $Z_2$ denotes alkanoylamino or alkoxyalkanoylamino, and to those of this formula in which $Z_1$ denotes $SO_2NV_1V_2$ and $Z_2$ denotes H.

It is of course also possible for the dyestuffs of the indicated formulae to be present in the form of their water-soluble salts, in particular their alkali metal, ammonium and amine salts.

The preferred mixing ratios depend on the nature of the desired hue. The dyestuff mixtures according to the invention are particularly suitable for producing beige, brown, green and olive shades.

Preferred dyestuff mixtures therefore consist of (a) 10–45% of dyestuff I or I+II, (b) 40–60% of dyestuff III, (c) 5–25% of dyestuff IV.

Eligible polyamide fibre materials are those made of wool, silk and above all synthetic polyamides.

These materials can be present in piece or rope form. Preference is given to using the dyestuffs of the formula I for the trichromatic dyeing of carpet material made of synthetic polyamides.

The fibre materials mentioned can be dyed by the customary dyeing processes at liquor ratios of 1.5:1 to 30:1.

Preference, however, is given to dyeing below the boil with sliding pH, as described for example in Melliand Textilberichte 58 (1977), 48–51. Particularly suitable is also the cold pad-batch process.

The blue dyestuffs to be used according to the invention are distinguished in the combination by an excellent on tone build-up, which leads to obtaining maximum levelness of the dyeings.

Owing to the fact that the dyestuff mixtures have these properties even at low dyeing temperatures, it is possible to dye under fibre-preserving and energy-saving conditions, so that in addition the formation of transverse and longitudinal breaks in piece material can be largely avoided.

In addition to these benefits and the advantages mentioned at the beginning, the blue dyestuffs of the formula I are distinguished in trichromatic dyeing by the absence of the undesirable catalytic fading effect.

As for the rest, the individual dyestuffs proposed above for trichromatic dyeing are almost all known and have been described for example in the following patent literature.

German Patent No. 2,710,152 (corresponding to U.S. Pat. No. 4,146,363)

German Offenlegungsschrift No. 2,063,907 (corresponding in part to U.S. Pat. No. 3,862,119)

German Pat. No. 1,794,389 (corresponding to U.S. Pat. No. 3,961,590).

However, blue dyestuffs of the formulae

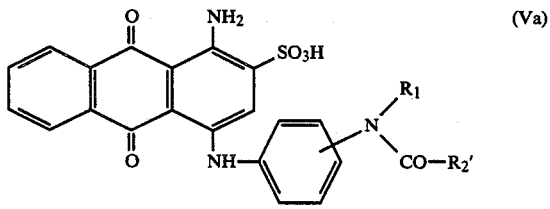

(Va)

in which $R_2'$ stands for $C_2$–$C_4$-alkyl, preferably ethyl, and $R_1$ has the abovementioned meaning and

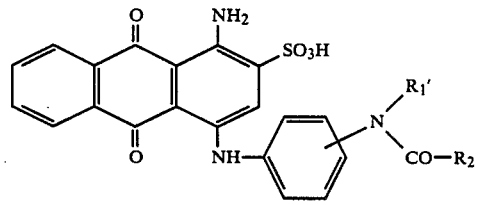

(Vb)

in which $R_1'$ stands for $C_3$–$C_4$-alkyl, preferably ethyl, and $R_2$ has the abovementioned meaning, are new, the dyestuffs of the formula Va where the $NR_1$—$COR_2'$ grouping is in the m-, in particular in the p-, position being particularly preferred.

The dyestuffs of the formula Va/Vb display the abovementioned useful properties to a particularly high degree and therefore the present invention relates to them as well.

The new dyestuffs are prepared by methods known per se (cf. German Reich Pat. Nos. 469,565, 542,499 and in particular 538,310).

The dyestuffs mentioned in the examples below are without exception used in the form of the sodium salts.

% is for the purposes of this invention % by weight.

EXAMPLE 1

0.02 g of the blue anthraquinone dyestuff of the formula A, 0.022 g of the orange dyestuff of the formula D, and 0.015 g of the red dyestuff of the formula E are dissolved in a total of 100 cm³ of hot deionized water. After addition of 5 cm³ of 10% strength ammonium acetate solution the solution is diluted with deionized water to a volume of 500 cm³. This dyebath is entered with a cutting of an undyed cut pile carpet having a pole content of 10 g of nylon 6 (velour material with polypropylene tape back) and is raised to the boil in the course of 20 minutes. After half an hour at the boil, 4 cm³ of 10% strength acetic acid are added, and the dyebath is maintained at the boil for a further half-hour. The carpet cutting is then removed from the dyebath, rinsed and dried at 70°–80°. The result is a very uniform brown dyeing of the carpet cutting, which has good light and wet fastness properties.

EXAMPLES 2–6

Dyeings having similar effects, but in some instances a somewhat different shade are obtained when dyestuff D is replaced by one of the following dyestuffs:

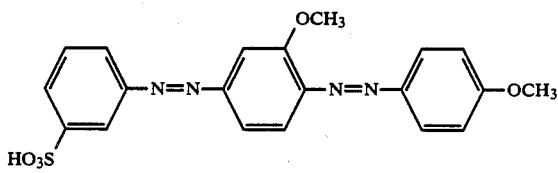

(2)

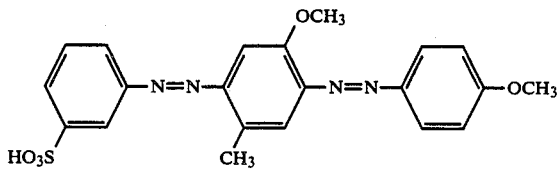

(3)

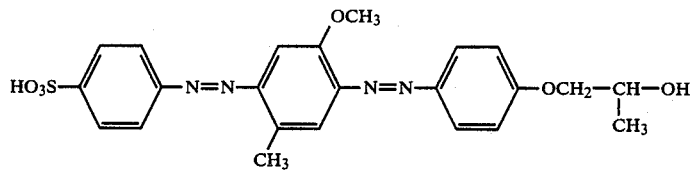
(4)
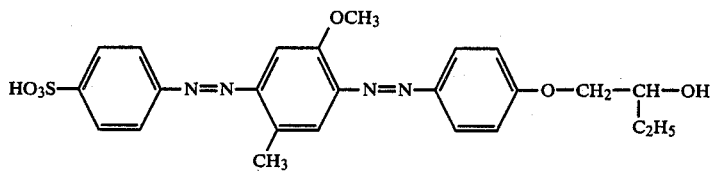
(5)
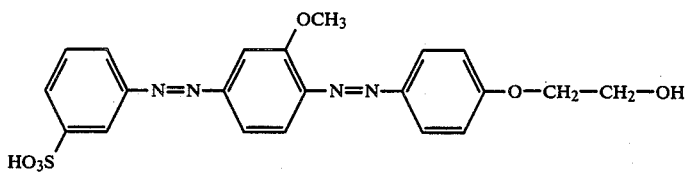
(6)
EXAMPLE 7–11
Dyeings having similar effects as described in Example 1 are obtained when dyestuff E is replaced by one of the following red dyestuffs:
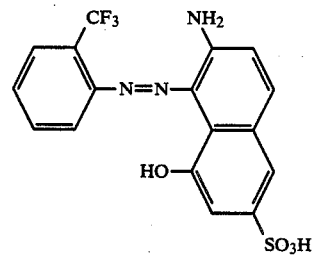
(7)
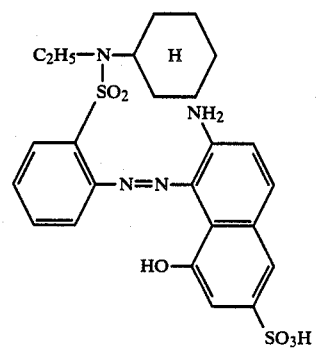
(8)
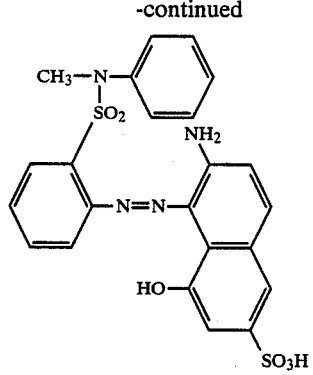
(9)
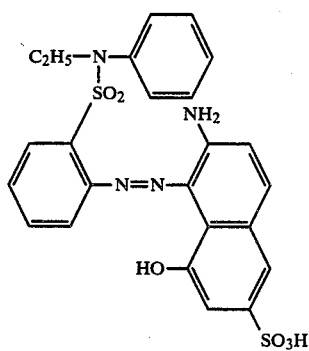
(10)
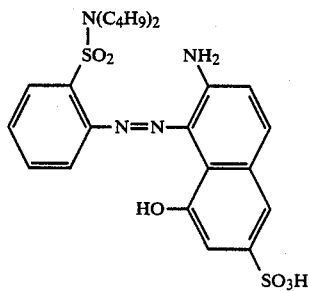
(11)

EXAMPLE 12

Example 1 is repeated using 0.023 g of the yellow dyestuff of the formula J, 0.012 g of the red dyestuff of the formula E, 0.012 g of the blue dyestuff of the formula C.

An immaculate beige dyeing is obtained.

EXAMPLE 13

Example 1 is repeated using 0.045 g of the red dyestuff of the formula H, 0.09 g of the yellow dyestuff of the formula D+K (1:1), 0.03 g of the blue dyestuff of the formula A+G (1:1).

An immaculate dyeing in a corresponding brown shade is obtained.

EXAMPLE 14

Tested polyamide carpet material is dyed by the method described in the abovementioned "Melliand" article under the following conditions:

Dyestuff mixture: 0.13% of B, 0.20% of E, 0.54% of K
Liquor ratio: 10:1
pH at the start: 9; at the end: 5
Sliding time: 90 minutes
Temperature at the start: 20° C.; at the end: 60° C.
Result: immaculate olive dyeing

EXAMPLE 15

Example 14 is repeated using a dyestuff combination of the following composition: 0.6% of B, 0.1% of E and 0.5% of K. Result: uniform green dyeing

EXAMPLE 16

A dyebath which contains 0.3% of B, 0.4% of E and 0.8% of D and also 1 g/l of ammonium acetate is entered with a polyamide fabric at a liquor ratio of 20:1. The temperature is then raised to the boil in the course of 20 minutes. After half an hour at the boil, 10% strength acetic acid is added (to pH 5), and the temperature is maintained at the boil for a further half-hour. The fabric is then removed from the dyebath, rinsed and dried at 70°-80°. The result is a very uniform brown dyeing having good fastness properties.

EXAMPLE 17

Example 16 is repeated using 0.2% of the red dyestuff of the formula L, 0.55% of the yellow dyestuff of the formula F, 0.1% of the blue dyestuff of the formulae A and G (1:1).

A reddish brown dyeing is obtained.

EXAMPLE 18

A velour carpet of nylon 6 having a weight of 700 g per square meter is coated in open width with 250% (on weight of fibre) of a dyeing liquor which contains, per 1,000 parts, the following components:

0.15 part of dyestuff B
0.16 part of dyestuff E
0.35 part of dyestuff D
3.00 parts of Indalca
3 parts of commercially available coacervating agent
10.00 parts of 60% acetic acid
1.00 part of wetting agent The carpet thus coated is then rotated for 18 hours at room temperature on a beam which is wrapped airtight in a plastic sheet and slowly rotates about its own axis. After the dyestuffs have been fixed, the carpet is rinsed and dried. This gives a well fixed and very uniform olive dyeing. The material shows no pile deformation whatsoever.

EXAMPLE 19

50 g of sodium 1-amino-4-bromoanthraquinone-2-sulphonate, 50 g of sodium hydrogencarbonate, and 30 g of N-(4-aminophenyl)-N-methylpropionamide are heated in 750 ml of water under nitrogen to 60°. 1 g of copper(I) chloride is added to the batch, the temperature of 60° is maintained further, and every 2 hours a further 1 g of copper(I) chloride is added. After 8 hours the temperature is reduced, the precipitated crystals are filtered off with suction at 20°, and the filter cake is washed with 4% strength sodium chloride solution.

The filter cake is heated in 750 ml of water to 80°, 50 ml of concentrated hydrochloric acid are added dropwise to the suspension in the course of 20 minutes, the mixture is subsequently stirred for 5 minutes, the precipitate is filtered off with suction while hot and the filter cake is washed with 1 l of warm 2% strength hydrochloric acid at 60°. The formula A dyestuff thus obtained can either be dried at 50° in a circulating air cabinet or, after neutralizaton in 500 ml of water with sodium carbonate solution and evaporation in a rotary evaporator or paddle dryer, be isolated as a blue powder in the form of a sodium salt.

EXAMPLE 20

20 g of 1-amino-4-(4'-methylaminophenylamino)anthraquinone-2-sulphonic acid are neutralized in 500 ml of water and 50 ml of acetone with sodium carbonate carbonate solution. 12 g of propionyl chloride are added dropwise in the course of one hour, and the pH in the reaction mixture is maintained at 5.5-6.0 by dropwise addition of sodium carbonate solution, which is followed by 45 minutes of stirring and monitoring by chromatography for complete conversion. The partially precipitated dyestuff is separated off completely by adding 25% strength sodium chloride, the blue precipitate is filtered off with suction, and the filter cake is washed with 10% strength and 5% strength sodium chloride solution. In this way another dyestuff identical to the dyestuff of the formula A is obtained.

EXAMPLE 21

The dyestuff of the formula C is obtained when the anthraquinone compound used in Example 20 is reacted with n-butyryl chloride in place of propionyl chloride.

The dyestuffs mentioned in the foregoing examples have the following formulae:

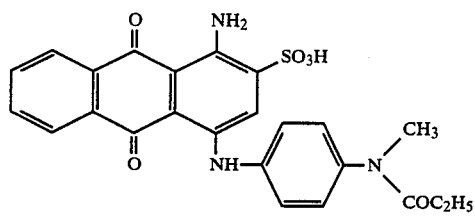 (A)
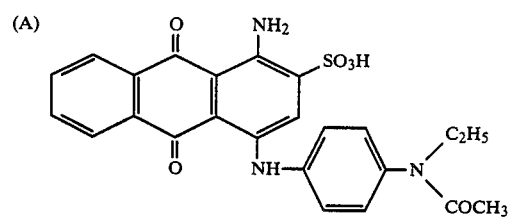 (B)
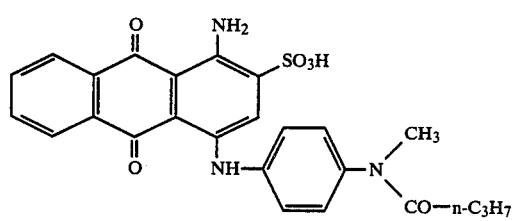 (C)
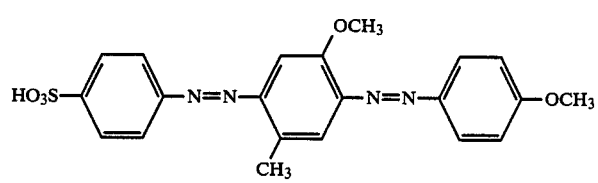 (D)
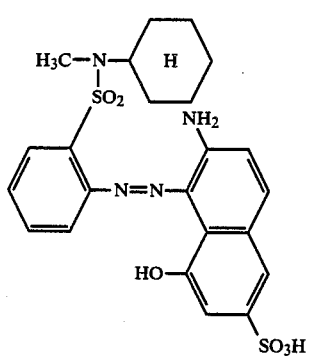 (E)
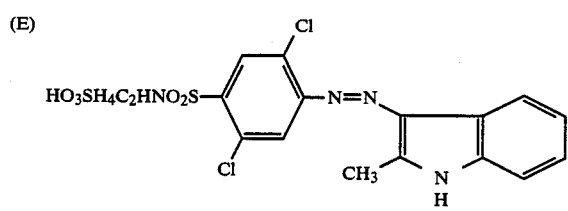 (F)
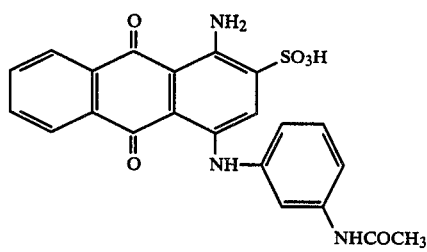 (G)
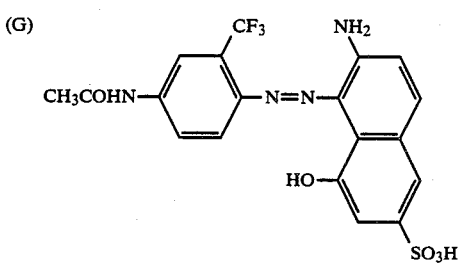 (H)
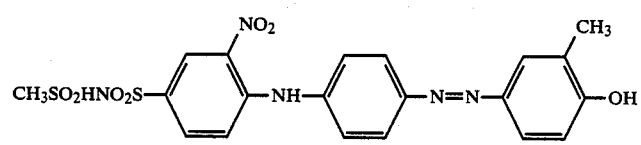 (J)
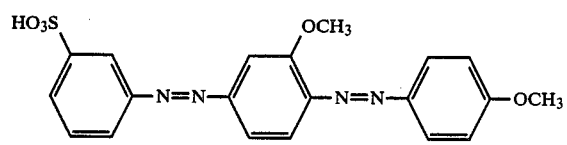 (K)

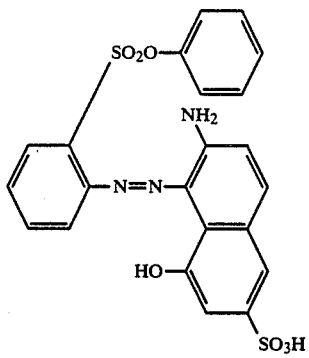

EXAMPLE 22

50 g of sodium 1-amino-4-bromoanthraquinone-2-sulphonate, 50 g of sodium hydrogencarbonate, and 26.5 g of N-(4-aminophenyl)-N-methylpropionamide are heated in 500 ml of water under nitrogen to 65° C. 1 g of copper(I) chloride is added to the batch, and the temperature is maintained at 65° C. for 6 hours. A further 0.5 g of copper(I) chloride is then added, the temperature is raised to 80° and the batch is maintained at 80° C. for a further 3 hours. About 50 ml of concentrated hydrochloric acid are then added dropwise at 70° C. until a pH of 1 is reached. The crystalline precipitate is filtered off with suction, and the filter cake is washed with warm 2% strength hydrochloric acid at 70° C. which contains 5% of sodium chloride in solution and subsequently with 750 ml of 5% strength sodium chloride solution. The dyestuff obtained is dried at 60° C. in a circulating air cabinet and constitutes a dark blue crystalline product (formula A).

We claim:

1. Process for dyeing or printing polyamide fibre materials by the trichromatic principle, characterized in that the blue component used is at least one dyestuff which, in the form of a free acid, conforms to the formula

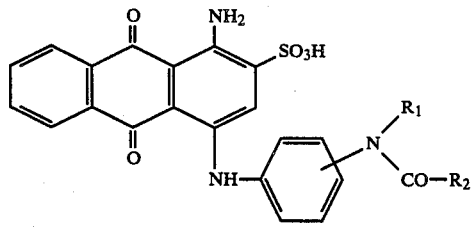

in which

R$_1$ and R$_2$ independently of each other denote C$_1$-C$_4$-alkyl, wih the proviso that the total number of C atoms in the radicals R$_1$ and R$_2$ is at least three and the —NR$_1$COR$_2$ grouping is situated in the m- or p-position.

2. Process according to claim 1, characterized in that the blue component used is a dyestuff of the indicated formula in which R$_1$ denotes methyl or ethyl and R$_2$ denotes methyl, ethyl or n-propyl, which is again subject to the abovementioned proviso.

3. Process according to claim 1, characterized in that the blue component used is a dyestuff of the indicated formula in which the NR$_1$COR$_2$ group is situated in in the p-position.

4. Process according to claim 1, characterized in that the blue dyestuff used is the dyestuff of the formula

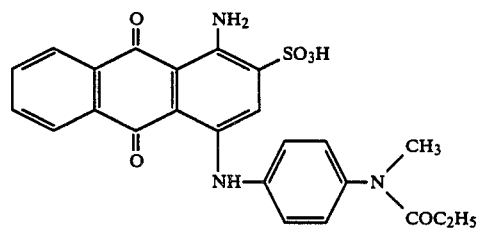

5. Process according to claim 1, characterized in that the blue dyestuff used is the dyestuff of the formula

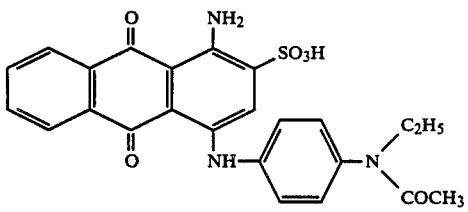

6. Process according to claim 1, characterized in that the yellow/orange component used are dyestuffs which, in the form of the free acid, conform to the formula

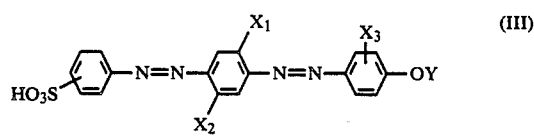

in which

X$_1$, X$_2$ and X$_3$ independently of one another denote hydrogen, C$_1$-C$_4$-alkyl or C$_1$-C$_4$-alkoxy and Y denotes C$_1$-C$_4$-alkyl or C$_2$-C$_4$-hydroxyalkyl, and the red component used are dyestuffs which, in the form of the free acid, conform to the formula

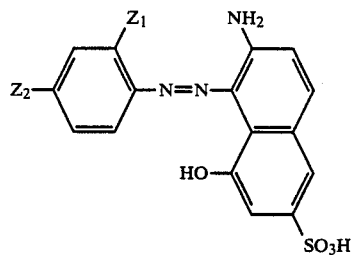

(IV)

in which
Z$_1$ denotes CF$_3$, SO$_2$W$_1$, SO$_3$W$_2$ or SO$_2$NV$_1$V$_2$ and
Z$_2$ denotes hydrogen, C$_2$-C$_4$-alkanoylamino, C$_1$-C$_4$-alkoxy-C$_2$-C$_4$-alkanoylamino or C$_1$-C$_5$-alkoxy,
with the proviso that Z$_2$ is hydrogen when Z$_1$ stands for SO$_2$W$_1$, SO$_3$W$_2$ or SO$_2$NV$_1$V$_2$, where
V$_1$ denotes C$_1$-C$_4$-alkyl,
V$_2$ denotes cyclohexyl, W$_2$ or C$_1$-C$_4$-alkyl,
W$_1$ denotes C$_1$-C$_4$-alkyl or W$_2$ and
W$_2$ denotes optionally CH$_3$— or Cl-substituted phenyl.

7. Process according to claim 1, characterized in that carpet material made of synthetic polyamide is dyed.

* * * * *